(12) United States Patent
Cai et al.

(10) Patent No.: US 11,928,078 B2
(45) Date of Patent: Mar. 12, 2024

(54) CREATING EFFECT ASSETS WHILE AVOIDING SIZE INFLATION

(71) Applicant: Lemon Inc., Grand Cayman (KY)

(72) Inventors: Zeyong Cai, Los Angeles, CA (US); Nite Luo, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/687,461

(22) Filed: Mar. 4, 2022

(65) Prior Publication Data
US 2023/0281162 A1 Sep. 7, 2023

(51) Int. Cl.
| G06F 16/13 | (2019.01) |
| G06F 9/445 | (2018.01) |
| G06F 16/16 | (2019.01) |
| G06F 16/955 | (2019.01) |

(52) U.S. Cl.
CPC .............. *G06F 16/13* (2019.01); *G06F 9/445* (2013.01); *G06F 16/168* (2019.01); *G06F 16/9566* (2019.01)

(58) Field of Classification Search
CPC ........ G06F 16/13; G06F 9/445; G06F 16/168; G06F 16/9566
See application file for complete search history.

(56) References Cited

U.S. PATENT DOCUMENTS

| 2013/0047074 A1* | 2/2013 | Vestergaard ..... H04N 21/44004 715/234 |
| 2017/0168472 A1* | 6/2017 | Ando .................. G06F 9/44521 |
| 2018/0131788 A1* | 5/2018 | Roberts ................. H04L 67/131 |
| 2018/0190003 A1* | 7/2018 | Upadhyay ............. G06T 15/005 |
| 2018/0275969 A1* | 9/2018 | Grigoryan ............. G06F 16/972 |
| 2019/0244257 A1* | 8/2019 | Goldman ........... G06Q 30/0276 |
| 2020/0358858 A1* | 11/2020 | Shribman ........... H04L 63/1466 |
| 2020/0368616 A1* | 11/2020 | Delamont ............ H04N 13/239 |
| 2021/0232645 A1* | 7/2021 | Sasaki ................. G06F 16/9538 |

FOREIGN PATENT DOCUMENTS

| CN | 102752525 A | 10/2012 |
| CN | 109697060 A | 4/2019 |
| CN | 110225246 A | 9/2019 |
| WO | WO 2020/211385 A1 | 10/2020 |

OTHER PUBLICATIONS

International Patent Application No. PCT/SG2023/050109; Int'l Search Report; dated Sep. 14, 2023; 4 pages.

* cited by examiner

*Primary Examiner* — Angelica Ruiz
(74) *Attorney, Agent, or Firm* — BakerHostetler

(57) ABSTRACT

The present disclosure describes techniques for effect asset creation. At one file of defining at least one new type of asset may be created based on an existing type of asset. Properties of the at least one new type of asset may be configured. The properties comprise an identifier of the at least one new type of asset and information indicative of the existing type of asset. The at least one new type of asset may be implemented with scripts. Implementing the at least one new type of asset with scripts comprises fetching a native object corresponding to the existing type of asset. The script-based at least one new type of asset enables to create new effect assets while avoiding an inflation of a package size of an effect creation tool.

20 Claims, 13 Drawing Sheets

700

```
┌─────────────────────────────────────────────────────────────┐
│ Create at least one file of defining at least one new type  │
│ of asset based on an existing type of asset 702             │
└─────────────────────────────────────────────────────────────┘
                              │
                              ▼
┌─────────────────────────────────────────────────────────────┐
│ Configure properties of the at least one new type of asset, │
│ wherein the properties comprise an identifier of the at     │
│ least one new type of asset and information indicative of   │
│ the existing type of asset 704                              │
└─────────────────────────────────────────────────────────────┘
                              │
                              ▼
┌─────────────────────────────────────────────────────────────┐
│ Implement the at least one new type of asset with scripts,  │
│ wherein the implementing the at least one new type of asset │
│ with scripts comprises fetching a native object             │
│ corresponding to the existing type of asset, wherein the    │
│ script based at least one new type of asset enables to      │
│ create new effect assets while avoiding an inflation of a   │
│ package size of an effect creation tool 706                 │
└─────────────────────────────────────────────────────────────┘
                              │
                              ▼
┌─────────────────────────────────────────────────────────────┐
│ Load the at least one file of defining the at least one new │
│ type of asset 708                                           │
└─────────────────────────────────────────────────────────────┘
                              │
                              ▼
┌─────────────────────────────────────────────────────────────┐
│ Load and initialize the scripts corresponding to the at     │
│ least one new type of asset 710                             │
└─────────────────────────────────────────────────────────────┘
                              │
                              ▼
┌─────────────────────────────────────────────────────────────┐
│ Drive the at least one new type of asset in image frames 712│
└─────────────────────────────────────────────────────────────┘
```

FIG. 7

```
JSON
{
  {
    "id": "123456",
    "type": "texture",
    "subType": "segmentation",
    "to": "RenderTexture",
    "properties": {
      "segmentationType": "body",
      "invert": true,
      "smoothness": 0.5,
      "useCutoutTexture": true,
      "cutoutTexture": "share://input.texture",
      "cutoutTextureInverseY": true
    }
  }
}
```

1102 — id
1104 — type
1106 — subType
1108 — to
1110 — properties

```
~-src
  '-- custom-asset
     |-- mesh
     |  |-- face-mesh-asset.ts
     |  '-- ...
     |-- texture
     |  |-- cam-input-texture-asset.ts
     |  |-- cam-input-texture-asset.ts
     |  |-- face-texture-asset.ts
     |  '-- ...
     |-- custom-asset-base.ts
     |-- custom-asset-provider.ts
     '-- custom-asset-registry.ts
```

FIG. 12

CREATING EFFECT ASSETS WHILE AVOIDING SIZE INFLATION

BACKGROUND

Communication is increasingly being conducted using Internet-based tools. The Internet-based tools may be any software or platform. Users may create content and design features via such Internet-based tools. Improved techniques for content creation and feature design via such tools are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 7 shows another example process for custom asset creation.

FIG. 11 shows an example file associated with a custom asset.

FIG. 12 shows an example file format associated with a custom asset.

DETAILED DESCRIPTION OF ILLUSTRATIVE EMBODIMENTS

Communication can be conducted using Internet-based tools that allow users to create content and distribute such content to other users for consumption. Such Internet-based tools may provide users with various effects to use when creating content. The effects can include, for example, augmented reality (AR) effects. However, existing effect creation tools do not allow users to create new resource types. As a result, users can only use resource types provided by the tools. This greatly limits the creativity and productivity of users.

Additionally, nearly all resource types provided by such existing tools are implemented in native code (i.e., C++). Thus, the package size of such existing tools increases dramatically as they support more resource types. Described herein are techniques that remedy these shortcomings of existing effect creation tools. Using the techniques described herein, the package size of the effect creation tool will not inflate as the tool supports more and more asset (e.g., resource) types. Additionally, users of the effect creation tool described herein can produce custom, new resource types with scripts. As a result, the users will experience increased creativity and productivity during effect design.

The techniques described herein facilitate a user's ability to write a wrapper for existing resource types with scripts (i.e., Lua, Javascript, etc.). New resources can be created by extending existing resource types on a script level. For example, users can render body segmentation onto a texture to create a type of texture (i.e., body segmentation texture). As the new resource type is technically a wrapper of existing resource types, the newly created resource type can still be recognized by other systems inside the tool. For example, the body segmentation texture may still be recognized as a texture by other systems inside the tool. Additionally, scripts can be loaded and/or unloaded dynamically. Users can download script-based resource types as needed, which prevents the size inflation issue present in existing effect creation tools.

Figure 1:
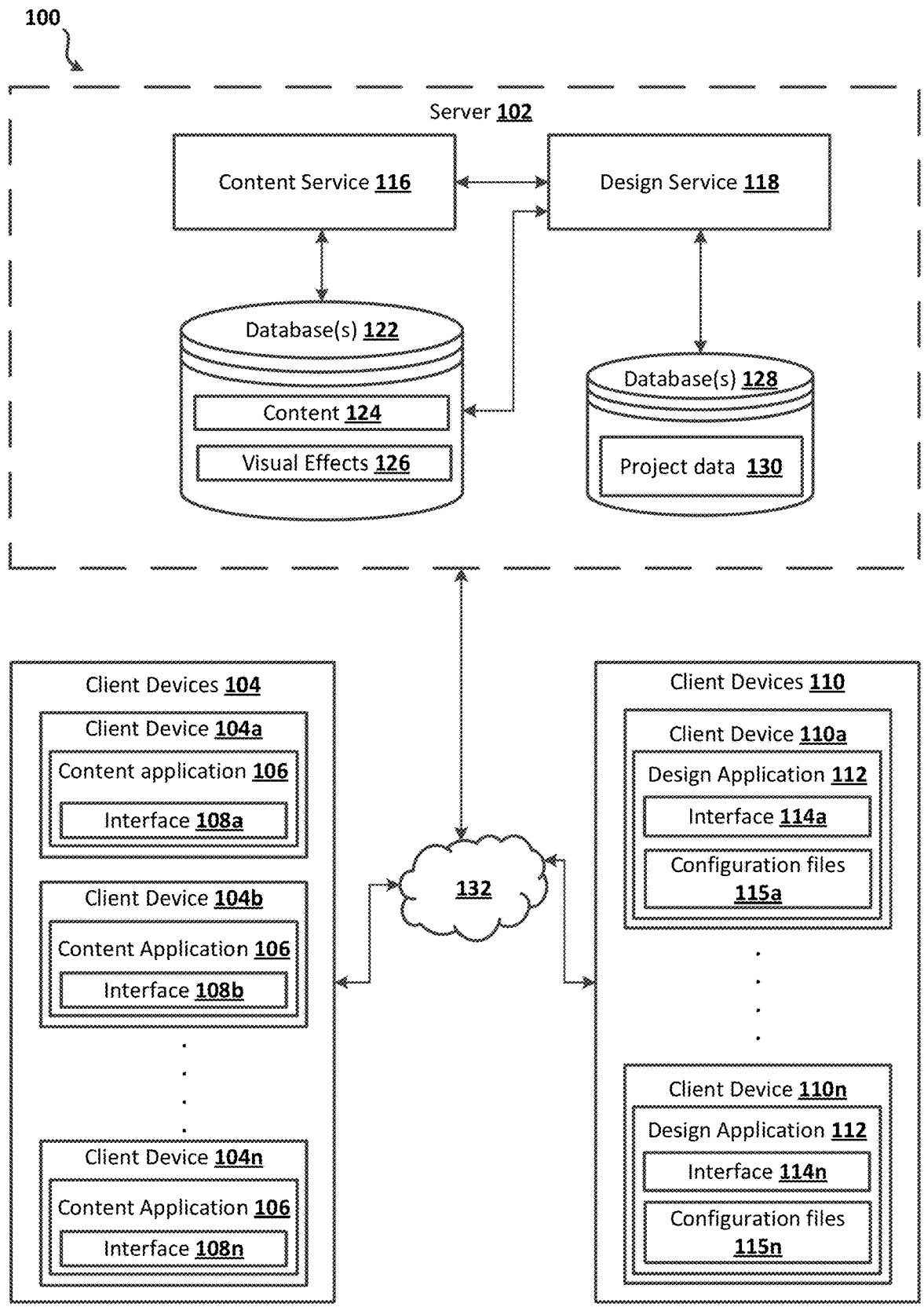
FIG. 1 shows an example system for designing new features which may be used in accordance with the present disclosure.

FIG. 1 illustrates an example system 100 for designing new features, such as effects, that may be used to create content for distribution. The system 100 may comprise a server 102, a first plurality of client devices 104a-n, and a second plurality of client devices 110a-n. The server 102, the first plurality of client devices 104a-n, and/or the second plurality of client devices 110a-n may communicate with each other via one or more networks 132.

The server 102 may be located at a data center, such as a single premise, or be distributed throughout different geographic locations (e.g., at several premises). The server 102 may provide services, such as a content service 116 and/or a design service 118, via the one or more networks 132. The network 132 comprise a variety of network devices, such as routers, switches, multiplexers, hubs, modems, bridges, repeaters, firewalls, proxy devices, and/or the like. The network 132 may comprise physical links, such as coaxial cable links, twisted pair cable links, fiber optic links, a combination thereof, and/or the like. The network 132 may comprise wireless links, such as cellular links, satellite links, Wi-Fi links and/or the like.

The server 102 may provide the content service 116. The content service 116 may comprise a content streaming service, such as an Internet protocol video streaming service. The content service 116 may be configured to distribute content 124 via a variety of transmission techniques. The content service 116 is configured to provide the content 124, such as video, audio, textual data, a combination thereof, and/or the like. The content 124 may comprise content streams (e.g., video stream, audio stream, information stream), content files (e.g., video file, audio file, text file), and/or other data. The content 124 may be stored in a database 122. For example, the content service 116 may comprise a video sharing service, a video hosting platform, a content distribution platform, a collaborative gaming platform, and/or the like.

In an embodiment, the content 124 distributed or provided by the content service 116 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

The short videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other short videos may not comprise a pre-recorded audio overlay. For example, these short videos may feature an individual playing sports, performing practical jokes, or giving advice, such as beauty and fashion advice, cooking tips, or home renovation tips.

In an embodiment, the content 124 may be output to different client devices 104a-n via the network 132. The content 124 may be streamed to the client devices 104a-n. The content stream may be a stream of short videos received from the content service 116. The first plurality of client devices 104a-n may be configured to access the content 124 from the content service 116. In an embodiment, a client device 104a-n may comprise a content application 106. The content application 106 outputs (e.g., display, render, present) the content 124 to a user associated with the client device 104a-n. The content may comprise videos, audio, comments, textual data and/or the like.

The first plurality of client devices 104a-n may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The first plurality of client devices 104a-n may be associated with one or more users. A single user may use one or more of the first plurality of client devices 104a-n to access the server 102. The first plurality of client devices 104a-n may travel to a variety of locations and use different networks to access the server 102.

The content service 116 may be configured to receive input from users. The users may be registered as users of the content service 116 and may be users of the content application 106 operating on client devices 104a-n. The user inputs may include short videos created by users, user comments associated with short videos, or "likes" associated with short videos. The user inputs may include connection requests and user input data, such as text data, digital image data, or user content. The connection requests may comprise requests from the client devices 104a-na-d to connect to the content service 116. The user input data may include information, such as short videos and/or user comments, that the users connected to the content service 116 want to share with other connected users of the content service 116.

In an embodiment, a user may use the content application 106 on a client device 104a-n to create a short video and upload the short video to the server 102. The client devices 104a-n may access an interface 108a-n of the content application 106. The interface 108a-n may comprise an input element. For example, the input element may be configured to allow users to create the short video. To create the short video, the user may give the content application 106 permission to access an image capture device, such as a camera, or a microphone of the client device 104a-n. Using the content application 106, the user may select a duration for the short video or set a speed for the short video, such as "slow-motion" or "speed things up."

The user may edit the short video using the content application 106. The user may add one or more texts, filters, sounds, or effects, such as AR effects, to the short video. To add a pre-recorded audio overlay to the short video, the user may select a song or sound clip from a sound library of the content application 106. The sound library may include different songs, sound effects, or audio clips from movies, albums, and television shows. In addition to or in lieu of adding a pre-recorded audio overlay to the short video, the user may use the content application 106 to add a voice-over to the short video. The voice-over may be a sound recorded by the user using a microphone of the client device 104a-n. The user can add a text overlay to the short video and may use the content application 106 to specify when they want the text overlay to appear in the short video. The user may assign a caption, location tag, and one or more hashtags to the short video to indicate the subject matter of the short video. The content application 106 may prompt the user to select a frame of the short video to use as a "cover image" for the short video.

After the user has created the short video, the user may use the content application 106 to upload the short video to the server 102 and/or to save the short video locally to the user device 104a-n. When a user uploads the short video to the server 102, they may choose whether they want the short video to be viewable by all other users of the content application 106 or viewable by only a subset of the users of the content application 106. The content service 116 may store the uploaded short videos and any metadata associated with the short videos as content 124 in one or more databases 122.

In an embodiment, a user may use the content application 106 on a client device 104a-n to provide input on a short video. The client devices 104a-n may access an interface 108a-n of the content application 106 that allows users to provide input associated with short videos. The interface 108a-n may comprise an input element. For example, the input element may be configured to receive input from a user, such as comments or "likes" associated with a particular short video. If the input is a comment, the content application 106 may allow a user to set an emoji associated with his or her input. The content application 106 may determine timing information for the input, such as when a user wrote a comment. The content application 106 may send the input and associated metadata to the server 102. For example, the content application 106 may send a comment, an identifier of the user that wrote the comment, and the timing information for the comment to the server 102. The content service 116 may store the input and associated metadata in a database 122.

The content service 116 may be configured to output the uploaded short videos and user input to other users. The users may be registered as users of the content service 116 to view short videos created by other users. The users may be users of the content application 106 operating on client devices 104a-n. The content application 106 may output (display, render, present) the short videos and user comments to a user associated with a client device 104a-n. The client devices 104a-n may access an interface 108a-n of the content application 106. The interface 108a-n may comprise an output element. The output element may be configured to display information about different short videos so that a user can select a short video to view. For example, the output element may be configured to display a plurality of cover images, captions, or hashtags associated with the short videos. The output element may also be configured to arrange the short videos according to a category associated with each short video.

In an embodiment, the user comments associated with a short video may be output to other users watching the same short video. For example, all users accessing a short video may view comments associated with the short video. The content service 116 may output the short video and the associated comments simultaneously. Comments may be output by the content service 116 in real-time or near-real-time. The content application 106 may display the short videos and comments in various ways on the client device 104a-n. For example, the comments may be displayed in an overlay above the content or in an overlay beside the content. As another example, a user that wants to view other users' comments associated with a short video may need to select a button in order to view the comments. The comments may be animated when displayed. For example, the comments may be shown scrolling across the short video or across the overlay.

In an embodiment, the content service 116 may provide a plurality of visual effects 126 to users of the content service 116 so that the users can create videos, such as short videos, using one or more of these effects. The effects 126 can include, for example, one or more AR effects. AR effects are computer-generated effects layered over the real-life image that a user's camera displays. However, for the reasons described above, designing such effects 126 can be complicated and time-consuming.

In an embodiment, the server 102 provides a design service 118. The design service 118 may be configured to facilitate the design of effects 126 by a designer associated with a client device of the second plurality of client devices 110a-n. The second plurality of client devices 110a-n may be different from the first plurality of client devices 104a-n. For example, the second plurality of client devices 110a-n may each be associated with one or more designers that want to design an effect 126, so that the users associated with the first plurality of client devices 104a-n can create videos using the designed effects 126 via the content application 106. The second plurality of client devices 110a-n may comprise the design application 112. The design application 112 may be used by the designers to design effects 126. For example, the designers can access an interface 114a-n of the design application 112 to design effects 126.

The second plurality of client devices 110a-n may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. A single designer may use one or more of the second plurality of client devices 110a-n to access the server 102. The second plurality of client devices 110a-n may travel to a variety of locations and use different networks to access the server 102.

The design service 118 may be configured to maintain, in a database 128, project data 130. The stored project data 130 may be received, for example, from designers associated with the client devices 110a-n. The project data 130 may include data associated with various design projects. Each design project may be associated with the design of a particular effect 126. For example, the project data 130 may include data associated with a first project. The first project may be associated with the design of a first effect 126, and the first project may be associated with one or more scenes that comprise the first effect 126. The project data 130 associated with the first project may indicate the current state of the design of the first effect 126. For example, the project data 130 associated with the first project may indicate all work that has been saved and/or uploaded to the server 102. However, the project data 130 may not indicate changes or modifications to first effect 126 that the designer tried out or tested during the design process but decided not to implement.

In an embodiment, the design service 118 is configured to send, to client devices 110a-n, the project data 130. For example, the design service 118 may send, to a client device 110a-n, the project data 130 associated with a first project in response to receiving a request from that client device. The request may include an indication of a selection of the first project. For example, a designer may select the first project if the designer wants to work on the design of the first effect. The designer may want to work on the project for the first time, or the designer may want to continue previous work that the designer (or even another designer) has done on the first project. In response to receiving such a request, the design service 118 can send the project data 130 indicating the current state of the first project to the client device 110a-n.

In embodiments, the client devices 110a-n are configured to receive, from the design service 118, the project data 130. For example, the client devices 110a-n may receive the project data 130 associated with the first project in response to sending a request for the project data 130 associated with the first project to the design service 118. The client devices 110a-n may send the request for the project data 130 associated with the first project to the design service 118 if the designer selects the first project in the design application 112 via the interface 114a-n of the design application 112. The designer may select the first project in the design application if the designer wants to start or continue work on the design of the first effect.

In embodiments, if the client devices 110a-n receive, from the design service 118, project data 130, a main preview window of the at least one scene comprising the first effect may be displayed on the interface 114a-n. As described above, the project data 130 associated with a particular project may indicate the current design state of the effect associated with that project. Accordingly, the main preview window provides a display or preview of what the effect would currently look like to a user 104a-n when it is applied on an image or video feed, based on the current design state of the effect. For example, the main preview window may render an AR effect to a 2D texture. The designer can view the main preview window to gain an understanding of how the original scene would look (e.g., how the effect would look if no more changes or modifications were made to the design of the effect).

In embodiments, the designers may utilize the design application 112 to test out various changes to a scene comprising an effect. For example, after the main preview window of a scene comprising the first effect is displayed on the interface 114a-n, a designer may want to see the impact of various modifications or changes to the design of the effect. To do so, the designer can utilize the design application 112 to spawn multiple secondary preview windows associated with the project. Each secondary preview window may resemble the main preview window. For example, each secondary preview window may render an AR effect to a 2D texture. To spawn a secondary preview window associated with the project, the designer may select a button (e.g., a (+) button) on the interface 114a-n of the design application. Each time the designer selects the button, an additional secondary preview window may be spawned and displayed on the interface 114a-n. The designer may spawn as many secondary preview windows as he or she desires.

Each secondary preview window displays the current state of the effect (such as that indicated by the main preview window) as well as any additional objects that the designer has added to that scene to test them out. The content displayed in each secondary preview window can be adjusted separately from the content displayed in the other secondary preview windows. Such adjustments may only apply locally (e.g., only apply on the client devices 110a-n) and will not appear on the design service 118 side, because one purpose of these multiple secondary preview windows is to test what edits to properties of the original scene would look like (and not necessarily to make final adjustments to the project data 130).

In embodiments, data associated with the multiple secondary preview windows may be saved in individual configuration files 115a-n. For example, if a designer spawns three secondary preview windows associated with the first effect design project, three configuration files, one corresponding to each secondary preview window, may be saved locally on the client device 110a-n, but not on the server-side (e.g., may not be saved as project data 130). The configuration files 115a-n may be modified to indicate the adjustments made to content displayed in the corresponding secondary preview window. For example, if a designer makes a change to at least one attribute of the effect in a particular secondary preview window corresponding to a particular configuration file, that particular configuration file may be modified to reflect this attribute change. The modified configuration files may be further modified if/when additional design changes are made. In embodiments, the project data 120 may comprise a "main" configuration file in the root of a project folder. The main configuration file may be utilized to keep track of how many secondary preview windows a project contains. This may allow the project to automatically spawn the preview processes.

In an embodiment, a designer may want to pick-up a design project where he or she last left off. For example, a designer may have made a change to at least one attribute of an effect in a particular secondary preview window corresponding to a particular configuration file. That particular configuration file may have already been modified to reflect this attribute change. The designer may decide to take a break or exit out of the design application 112. The designer (or a different designer) may later load the locally saved, modified configuration files to continue work on the design project. If the designer (or a different designer) later loads the locally saved, modified configuration files, secondary preview windows may be displayed based on the modified configuration files. The designer may make additional design changes within the secondary preview windows. If so, the modified configuration files may be further modified and saved locally.

In an embodiment, the designer may want to make an actual change (not just a locally saved change) to the design of an effect 126. For example, after viewing the previous window(s), the designer may decide that the designer likes the way a particular design change or modification looks. The designer may decide that this particular design change or modification should be implemented in the final design of the effect 126. Accordingly, the designer may indicate, such as via the interface 114a-n of the design application 112, that such design change or modification should be made on the server-side. If the designer does so, an indication may be sent to the design service 118. The indication may instruct the design service 118 to update the project data 130 associated with the project of the corresponding effect based on this design change or modification.

In an embodiment, the design service 118 is configured to receive, from client devices 110a-n, data indicative of updates (e.g., changes or modifications) to the project data 130. For example, the design service 118 can receive the indication that instructs the design service 118 to update the project data 130 associated with a project corresponding to an effect that has a modified or changed design. The design service 118 may update the project data 130 in response to receiving such an indication.

When the design service 118 makes changes to the project data 130 associated with an effect, the design service 118 may send a message (e.g., socket message) to the client devices 110a-n instructing the client devices 110a-n to update the main preview window displaying a scene comprising the effect. As a result, the designer that made the change or modification to the effect may see the main preview window change so that the main preview window now reflects the recent change or modification. Additionally, any other designer that later works on the design of this particular effect will see this updated main preview window (instead of the preview window that was displayed before these changes to the design were implemented). If the main preview window displaying a scene comprising the effect is updated, any spawned secondary preview window that is currently open (or that is opened at a later time) can additionally be updated to reflect the recent design change or modification.

In an embodiment, after a designer has used the design service 118 to create an effect, the effect may be stored as a visual effect 126 in the database 122. The stored effect 126 can be used by the users associated with the first plurality of client devices 104a-n to create videos via the content application 106. As described above, the plurality of effects 126 can include one or more AR effects. If the user selects an AR effect to create a video, the AR effect may overlay or superimpose at least one 2D or 3D virtual object on at least one subset of frames of the video. For example, if the user wants to create a video using an AR effect, the user may open a camera of a client device 104a-n to present the physical world onscreen live. The AR effect superimposes or overlays 2D or 3D virtual objects on the camera feed, creating the illusion that these objects actually exist. After the video has been created with the effect, the video may be uploaded to the server 102 and/or the user may save the video locally to the client device 104a-n. The content service 116 may be configured to output the uploaded video created with the effect to other users that are registered as users of the content service 116 via the content application 106. The other users may consume the video created with the effect.

Figure 2:
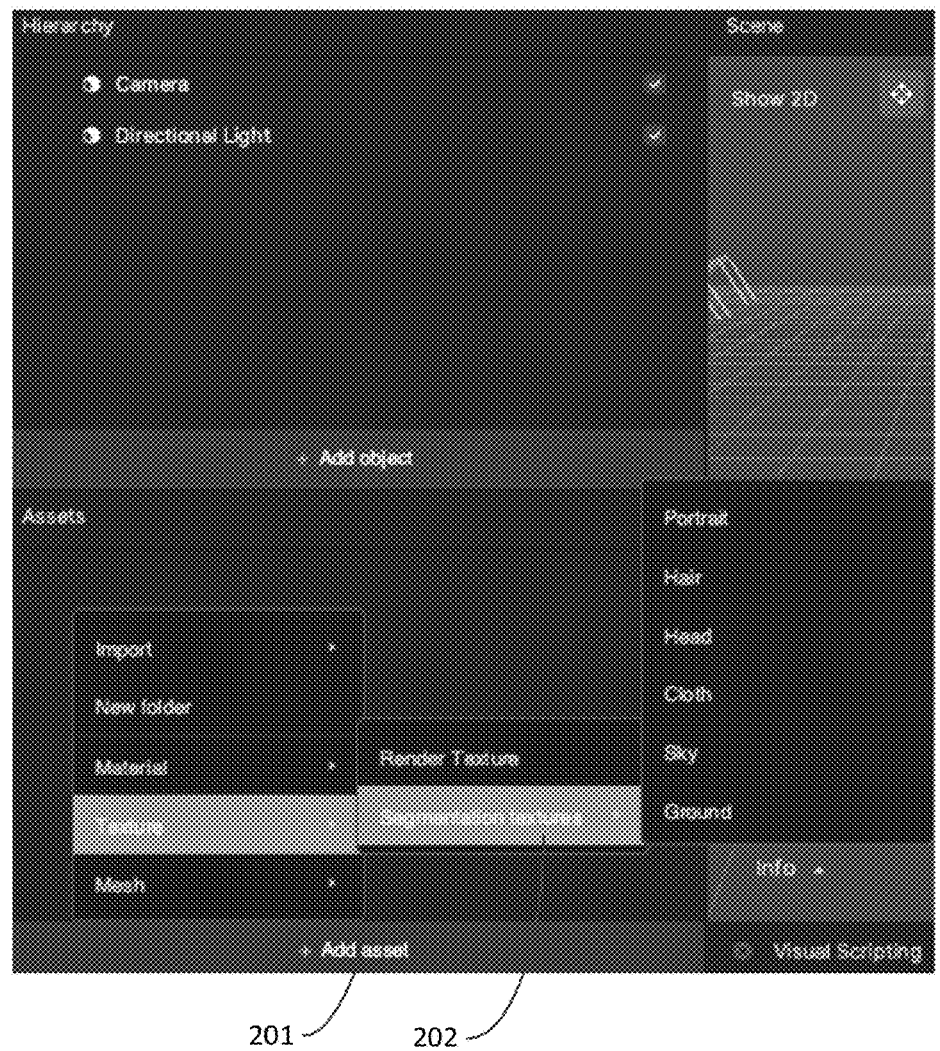
FIG. 2 shows an example user interface for custom asset creation in accordance with the present disclosure.

In an embodiment, a user of the design service 118 or the design application 112 may be able to create new, custom assets using scripts. The user may create the new assets for use in a design project, for example. FIG. 2 illustrates a user interface (UI) 200 for custom asset creation in accordance with the present disclosure. A user, such as a user of the design service 118, may create a custom asset by extending an existing asset type (e.g., texture, mesh, etc.), without ever touching C++ code. To create a custom asset, the user may select an "Add Asset" button 201. If the "Add Asset" button 201 is selected, the user may choose which existing asset type the user wants to extend. For example, a user may create a head segmentation mask by extending the existing asset type, "texture." To do so, the user may, within a resources window, select a "Segmentation Texture" button 202 and then specify its type as "Head." The user may then use the asset as a normal texture. In other embodiments, the user may create a background, hair, shoulder, or face segmentation mask by selecting the "Segmentation Texture" button 202 and then specifying the corresponding type. In some embodiments, the user may create a custom asset by extending the existing asset type, "mesh," instead.

The user may modify the asset properties and organize the assets in a desired folder structure. The user can modify the asset properties, such as by specifying a type, inverting a mask, increasing/decreasing feathering, and/or refining edges. For example, the user can create two segmentation textures (portrait and head) and one hair texture. All three of these textures may be organized under a "Texture" folder. The assets may then be attached to exposed properties on a Script component in the scene (e.g., project). Attached assets may be accessed directly in the code.

Figure 3:
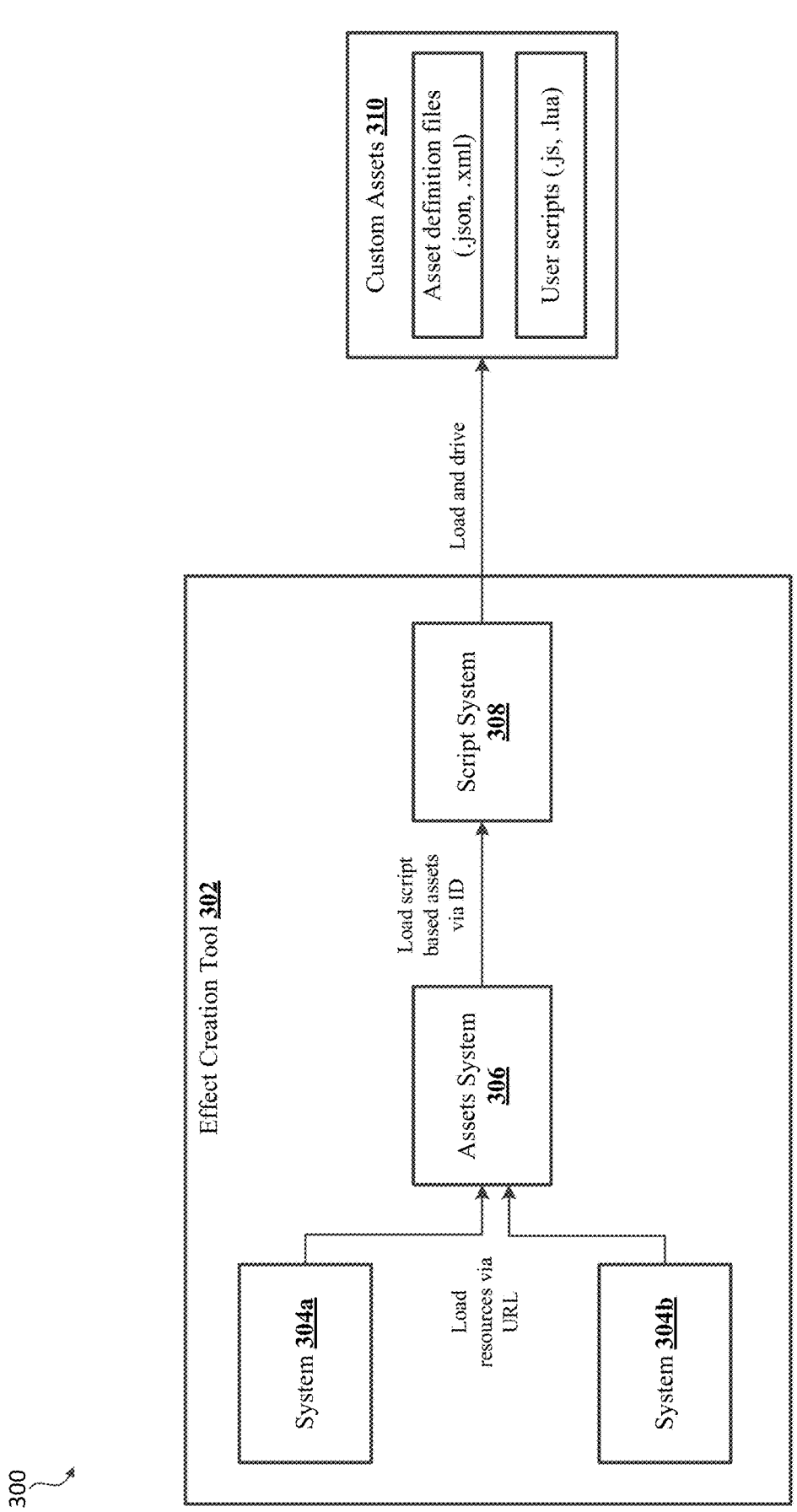
FIG. 3 shows an example system for custom asset creation in accordance with the present disclosure.

FIG. 3 illustrates an example system 300 for utilizing assets in a design project. Each asset may have its own unique Uniform Resource Locator (URL). With the URL, an asset can be accessed anywhere in the tool. The plurality of systems 304a-b in an effect creation tool 302 may access/load one or more assets based on URLs corresponding to the assets. The effect creation tool 302 may, for example, be a component of the design service 118 or the design application 112 of FIG. 1. The URL may include the identifier (ID) of the asset. For example, the systems 304a-b cause the assets system 306 to load the one or more assets based on the corresponding URL. The assets system 306 may store information related to custom assets that are created by users. All custom assets are managed by a script system 308. The script system 308 may load and drive custom assets 310. Each custom asset 310 may include an asset definition file and a user script file. Each of these are discussed in more detail below.

Figure 4:
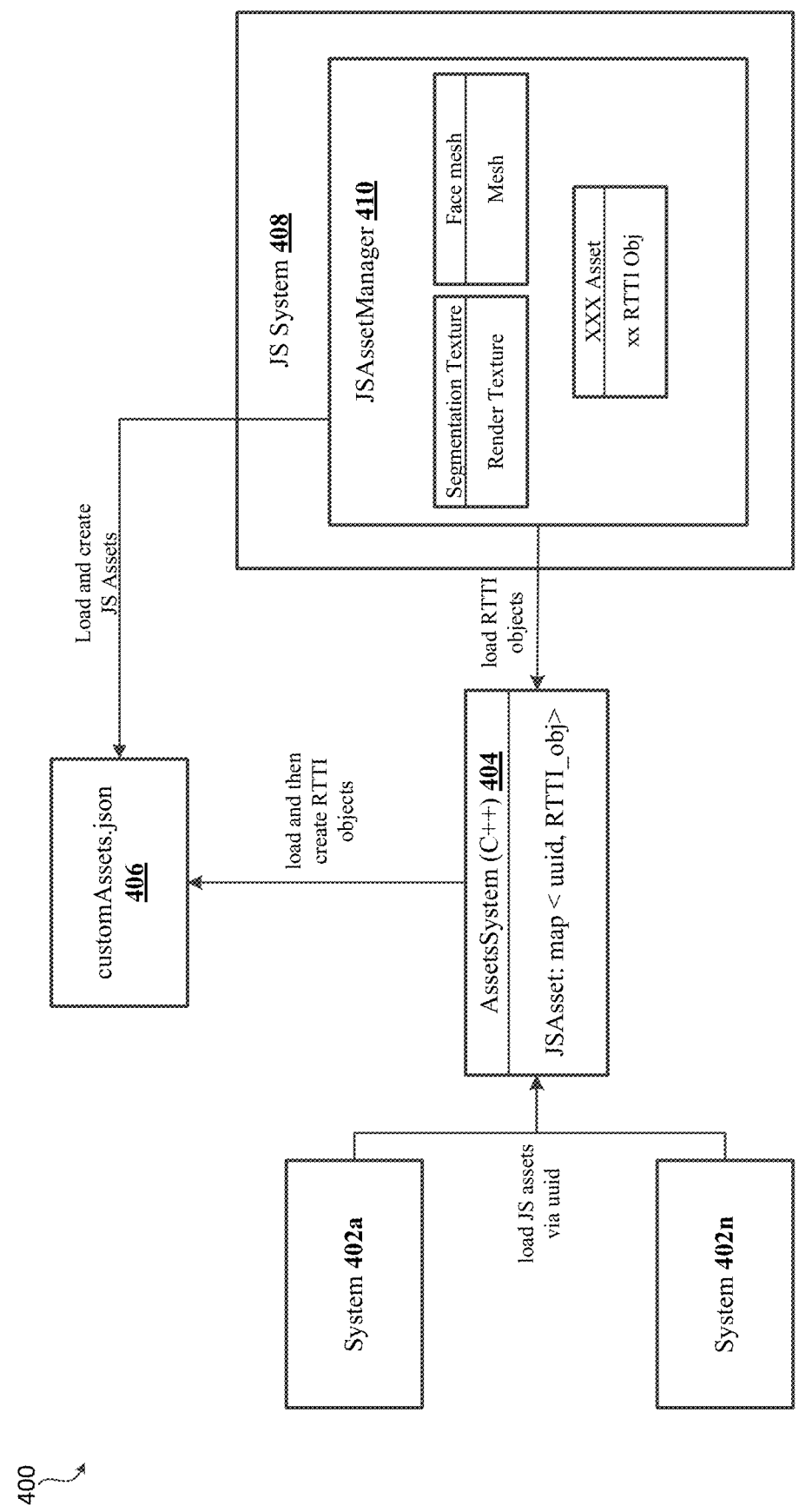
FIG. 4 shows another example system for custom asset creation in accordance with the present disclosure.

FIG. 4 illustrates another example system 400 for utilizing assets in a design project. Each custom asset may have its own unique Uniform Resource Locator (URL). With the URL, a custom asset can be accessed anywhere in the tool. The plurality of systems 402a-n in an effect creation tool may access/load one or more custom assets based on a unique ID ("uuid") corresponding to the asset(s). The uuid may, for example, be included in a URL associated with the assets. For example, the systems 402a-n cause an assets system 404 to load the one or more custom assets based on the uuid and a native object type that the custom asset passes to the engine. The native object type that the custom asset passes to the engine may be referred to as "rtti" or "RTTI." The assets system 404 may load RTTI objects from a JSAssetManager 410 (i.e., custom asset manager) of a javascript (JS) system 408. The assets system 404 may load and create RTTI objects for a custom asset JSON (JavaScript Object Notation) file 406. The JSAssetManager 410 may load and create custom assets (i.e., JS assets) for the custom asset JSON file 406.

Figure 5:
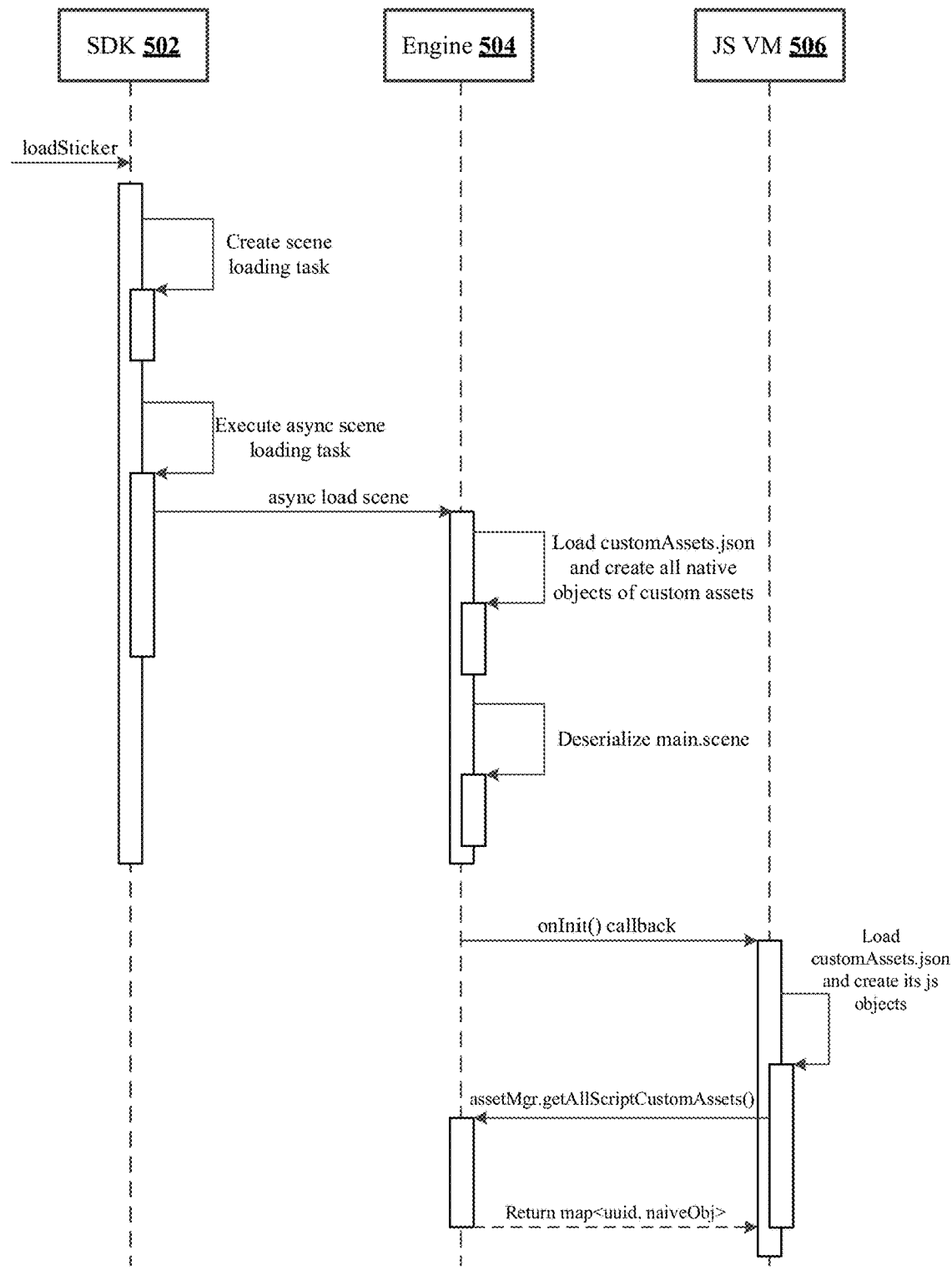
FIG. 5 shows a flow diagram depicting initialization of a custom asset in accordance with the present disclosure.

FIG. 5 illustrates a flow diagram 500 depicting the custom asset initialization process. The javascript virtual machine (JS VM) 506 can only run in a main/rendering thread, while scene loading might happen in another thread (async loading). For example, an SDK 502 may create a scene loading task and execute the async scene loading task. An engine 504 may load a custom asset file (e.g., customAssets.json 406) and create its native objects when loading a scene. After scene loading, JS code will fetch all the native objects created by the engine 504. For example, segmentationAsset provides a renderTexture as output. The renderTexture may be updated every frame in the JS segmentationAsset code. The renderTexture may be created by the engine 504 before any JS code is run.

Figure 6:
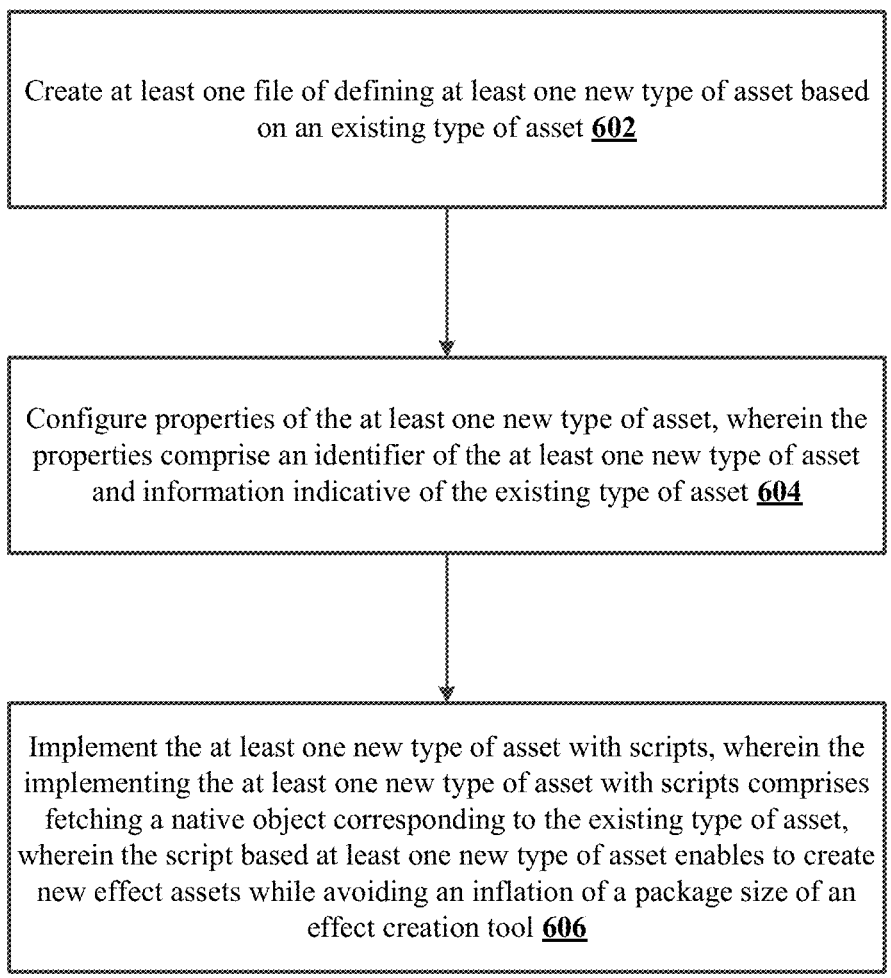
FIG. 6 shows an example process for custom asset creation.

FIG. 6 illustrates an example process 600 performed by one or more components shown in the diagram 100. For example, the process 600 may be performed, at least in part, by a design service (e.g., design service 118) or a design application (e.g., design application 112). The process 600 may be performed to facilitate the creation of a custom asset. Although depicted as a sequence of operations in FIG. 6, those of ordinary skill in the art will appreciate that various embodiments may add, remove, reorder, or modify the depicted operations.

As described above, a user, such as a user of the design service 118 or the design application 112, may create a custom asset by extending an existing asset type, without ever touching C++ code. At 602, at least one file defining at least one new type of asset may be created based on an existing type of asset. The at least one file defining the at least one new type of asset may be in any suitable format, such a JSON (JavaScript Object Notation) format or an XML (Extensible Markup Language) format. The existing (e.g., native) asset type may comprise, for example, texture or mesh.

At 604, properties of the at least one new types of asset may be configured. The properties comprise an identifier of the at least one new type of asset and information indicative of the existing type of asset. Each asset definition may include four common properties and its specific properties. For example, each asset definition includes a unique ID for each asset ("uuid") for resource reference, a type that stands for a native asset type (e.g., texture, mesh), a subtype that stands for the newly defined custom asset type (e.g., segmentation), and a native object type that a custom asset passes to the engine (i.e., "rtti."). An effect custom asset entry may include a script path. The script path is the path where the user script is. An effect custom asset entry may include custom resource properties specified by user, such as color and size.

FIG. 11 illustrates an example file 1100 defining a new type of asset. Custom assets are JSON objects, and they may be organized in a single JSON file. The file 1100 is a JSON file. However, it should be appreciated that other files defining new types of assets may in formats other than JSON. The file 1100 includes a unique ID 1102 for each asset ("uuid") for resource reference, a type 1104 that stands for a native asset type (e.g., texture, mesh), a subtype 1106 that stands for the newly defined custom assets (e.g., segmentation), and a 1108 that stands for a native object type. The file 1100 also includes specific properties 1110. For example, the specific properties 1110 may include segmentation type, inversion, smoothness, whether cutout texture is used, etc.

FIG. 12 illustrates an example structure 1200 of organizing files defining new types of assets. The example structure 1200 includes a section associated with mesh. The section associated with mesh contains all custom asset classes whose type is mesh. The example structure 1200 includes a section associated with texture. The section associated with texture contains all custom asset classes whose type is texture. The example structure 1200 also includes a section associated with custom asset base, a section associated with custom asset provider, and a section associated with a custom asset registry.

Referring back to FIG. 6, at 606, the at least one new type of asset may be implemented with scripts. Implementing the new type of asset with scripts comprises fetching a native object corresponding to the existing type of asset. The script-based at least one new type of asset enables the creation of new effect assets while avoiding an inflation of a package size of an effect creation tool. The script language can be any computer language supported by the effect design tool. For example, the script language may be Javascript or Lua. All user scripts may be managed by a script system. The script system loads and drives all the user scripts. The script system also provides interfaces for user to create and update native objects. For example, the script system can provide interfaces like onStart and onUpdate to perform initialization and update in user scripts. User scripts need to create the native object defined in the resource definition file.

FIG. 7 illustrates an example process 700 performed by one or more components shown in the diagram 100. For example, the process 700 may be performed, at least in part, by a design service (e.g., design service 118) or a design application (e.g., design application 112). The process 700 may be performed to facilitate the creation of a custom asset. Although depicted as a sequence of operations in FIG. 7, those of ordinary skill in the art will appreciate that various embodiments may add, remove, reorder, or modify the depicted operations.

As described above, a user, such as a user of the design service 118 or the design application 112, may create a custom asset by extending an existing asset type, without ever touching C++ code. At 702, at least one file defining at least one new type of asset may be created based on an existing type of asset. The at least one file defining the at least one new type of asset may be in any suitable format, such a JSON (JavaScript Object Notation) format or an XML (Extensible Markup Language) format. The existing (e.g., native) asset type may comprise, for example, texture or mesh.

At 704, properties of the at least one new types of asset may be configured. The properties comprise an identifier of the at least one new type of asset and information indicative of the existing type of asset. Each asset definition may include four common properties and its specific properties. For example, each asset definition includes a unique ID for each asset ("uuid") for resource reference, a type that stands for a native asset type (e.g., texture, mesh), a subtype stands for the newly defined custom asset type (e.g., segmentation), and a native object type that a custom asset passes to the engine (i.e., "rtti."). An effect custom asset entry may include a script path. The script path is the path where the user script is. An effect custom asset entry may include custom resource properties specified by user, such as color and size.

At 706, the at least one new type of asset may be implemented with scripts. Implementing the new type of asset with scripts comprises fetching a native object corresponding to the existing type of asset. The script-based on the at least one new type of asset may enable the creation of new effect assets while avoiding an inflation of a package size of an effect creation tool. The script language can be any computer language supported by the effect design tool. For example, the script language may be Javascript or Lua. All user scripts may be managed by a script system. The script system loads and drives all the user scripts. The script system also provides interfaces for user scripts to create and update native objects. For example, the script system can provide interfaces like onStart and onUpdate to perform initialization and update in user scripts. User scripts need to create the native object defined in the resource definition file.

At 708, the at least one file of defining the at least one new type of asset may be loaded. For each custom asset, the script system may load and initialize its corresponding scripts. At 710, the scripts corresponding to the at least one new type of asset may be loaded and initialized. The custom asset definition may be passed to the script during initialization. Then, the script system will get the native asset maintained by the script. This native asset can be accessed by other systems via its ID. At 712, the at least one new type of asset may be driven (e.g., applied, added to, etc.) in image frames. The effect creation tool may drive all of the custom assets in each frame. User scripts can do updates as needed every frame.

Figure 8:
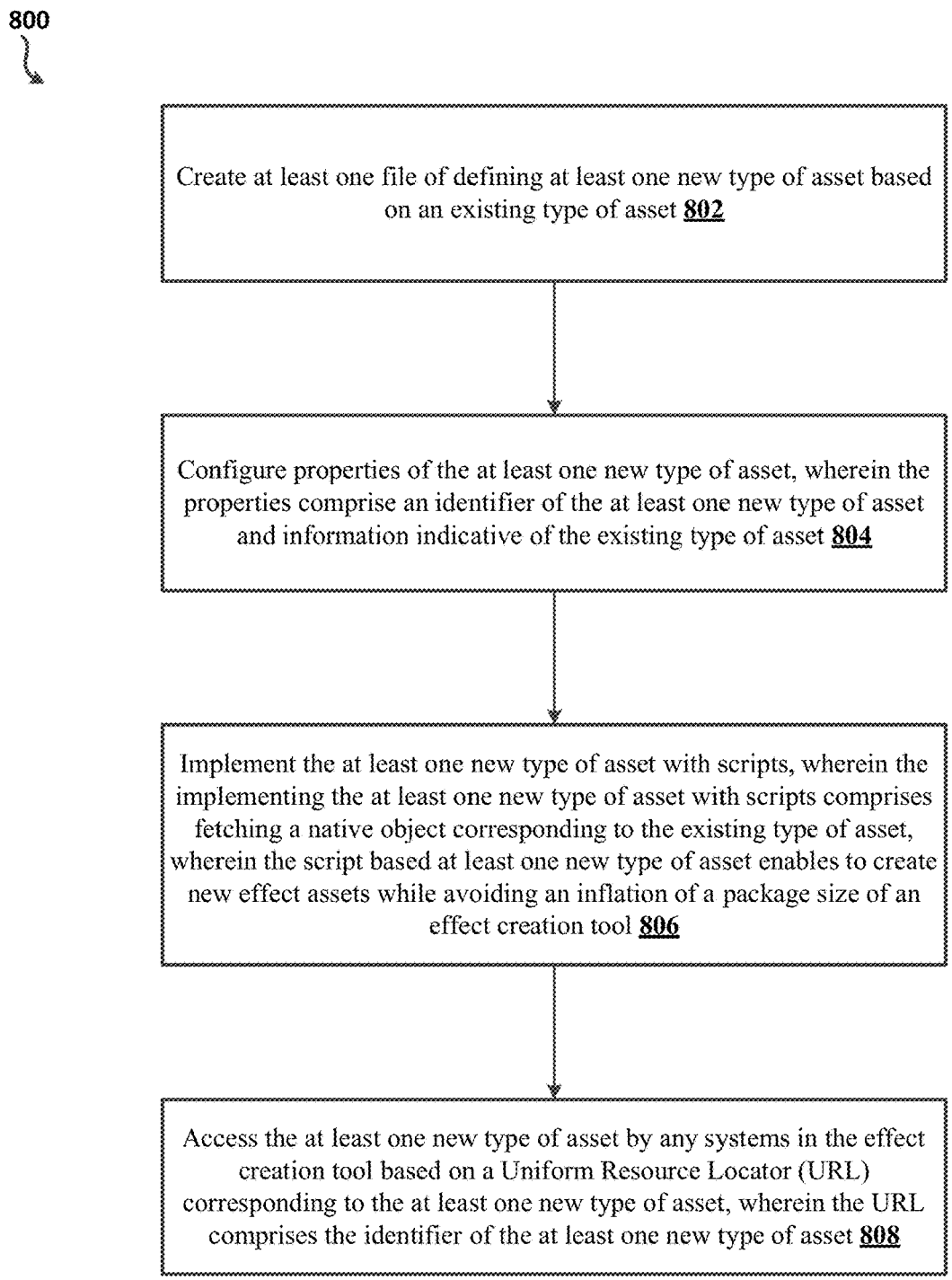
FIG. 8 shows another example process for custom asset creation.

FIG. 8 illustrates an example process 800 performed by one or more components shown in the diagram 100. For example, the process 800 may be performed, at least in part, by a design service (e.g., design service 118) or a design application (e.g., design application 112). The process 800 may be performed to facilitate the creation of a custom asset. Although depicted as a sequence of operations in FIG. 8, those of ordinary skill in the art will appreciate that various embodiments may add, remove, reorder, or modify the depicted operations.

As described above, a user, such as a user of the design service 118 or the design application 112, may create a custom asset by extending an existing asset type, without ever touching C++ code. At 802, at least one file defining at least one new type of asset may be created based on an existing type of asset. The at least one file defining the at least one new type of asset may be in any suitable format, such a JSON (JavaScript Object Notation) format or an XML (Extensible Markup Language) format. The existing (e.g., native) asset type may comprise, for example, texture or mesh.

At 804, properties of the at least one new types of asset may be configured. The properties comprise an identifier of the at least one new type of asset and information indicative of the existing type of asset. Each asset definition may include four common properties and its specific properties. For example, each asset definition includes a unique ID for each asset ("uuid") for resource reference, a type that stands for a native asset type (e.g., texture, mesh), a subtype that stands for the newly defined custom assets (e.g., segmentation), and a native object type that a custom asset passes to the engine (i.e., "rtti."). An effect custom asset entry may include a script path. The script path is the path where the user script is. An effect custom asset entry may include custom resource properties specified by user, such as color and size.

At 806, the at least one new type of asset may be implemented with scripts. Implementing the new type of asset with scripts comprises fetching a native object corresponding to the existing type of asset. The script-based on the at least one new type of asset may enable the creation of new effect assets while avoiding an inflation of a package size of an effect creation tool. The script language can be any computer language supported by the effect design tool. For example, the script language may be Javascript or Lua. All user scripts may be managed by a script system. The script system loads and drives all the user scripts. The script system also provides interfaces for user scripts to create and update native objects. For example, the script system can provide interfaces like onStart and onUpdate to perform initialization and update in user scripts. User scripts need to create the native object defined in the resource definition file.

Each script asset may have its own unique Uniform Resource Locator (URL). With the URL, a script asset can be accessed anywhere in the tool. At 808, the at least one new type of asset may be accessed by any systems in the effect creation tool based on a URL corresponding to the at least one new type of asset. The URL may include the identifier of the at least one new type of asset.

Figure 9:
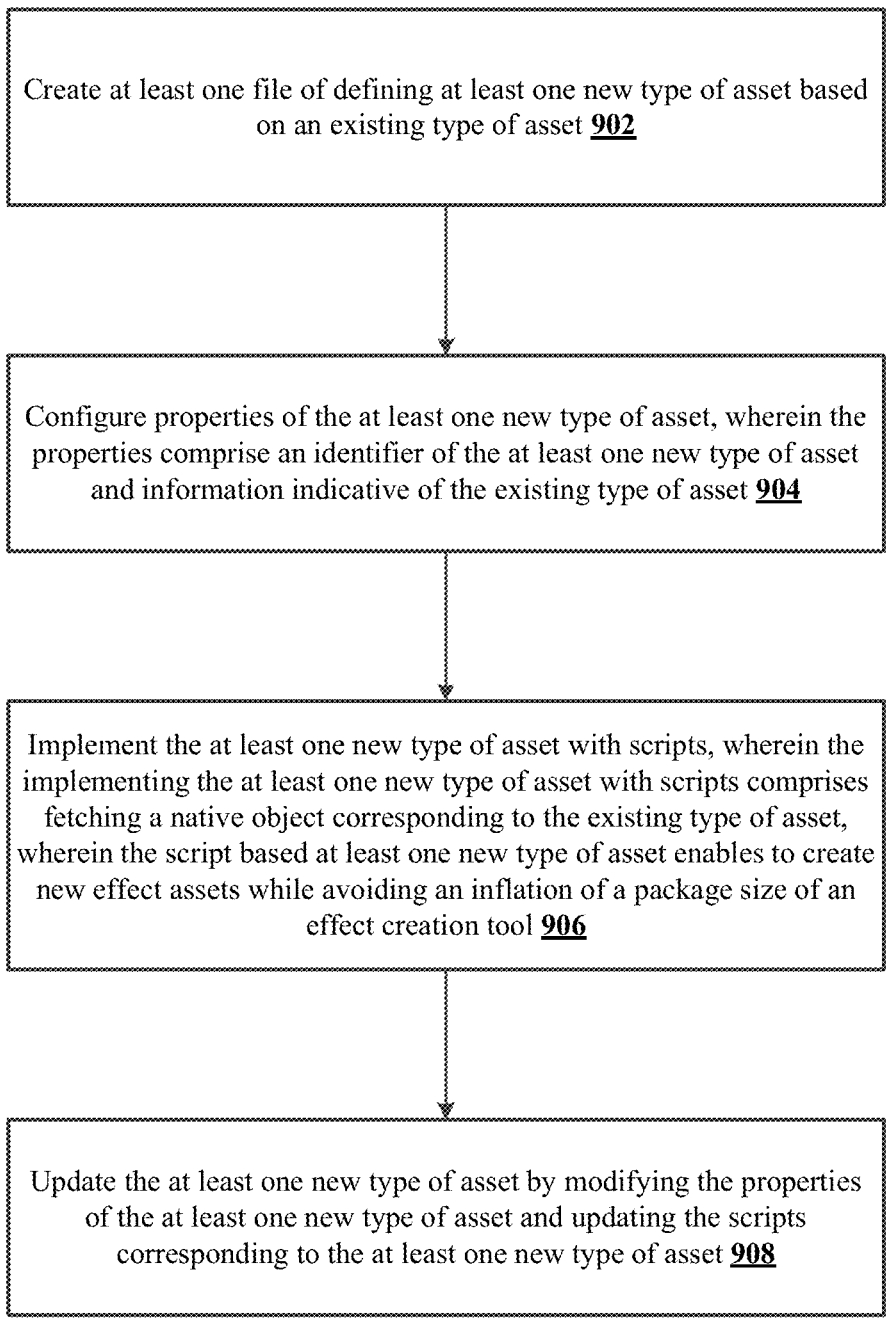
FIG. 9 shows another example process for custom asset creation.

FIG. 9 illustrates an example process 900 performed by one or more components shown in the diagram 100. For example, the process 900 may be performed, at least in part, by a design service (e.g., design service 118) or a design application (e.g., design application 112). The process 900 may be performed to facilitate the creation of a custom asset. Although depicted as a sequence of operations in FIG. 9, those of ordinary skill in the art will appreciate that various embodiments may add, remove, reorder, or modify the depicted operations.

As described above, a user, such as a user of the design service 118 or the design application 112, may create a custom asset by extending an existing asset type, without ever touching C++ code. At 902, at least one file defining at least one new type of asset may be created based on an existing type of asset. The at least one file defining the at least one new type of asset may be in any suitable format, such a JSON (JavaScript Object Notation) format or an XML (Extensible Markup Language) format. The existing (e.g., native) asset type may comprise, for example, texture or mesh.

At 904, properties of the at least one new types of asset may be configured. The properties comprise an identifier of the at least one new type of asset and information indicative of the existing type of asset. Each asset definition may include four common properties and its specific properties. For example, each asset definition includes a unique ID for each asset ("uuid") for resource reference, a type that stands for a native asset type (e.g., texture, mesh), an subtype that stands for the newly defined custom assets (e.g., segmentation), and a native object type that a custom asset passes to the engine (i.e., "rtti."). An effect custom asset entry may include a script path. The script path is the path where the user script is. An effect custom asset entry may include custom resource properties specified by user, such as color and size.

At 906, the at least one new type of asset may be implemented with scripts. Implementing the new type of asset with scripts comprises fetching a native object corresponding to the existing type of asset. The script-based on the at least one new type of asset may enable the creation of new effect assets while avoiding an inflation of a package size of an effect creation tool. The script language can be any computer language supported by the effect design tool. For example, the script language may be Javascript or Lua. All user scripts may be managed by a script system. The script system loads and drives all the user scripts. The script system also provides interfaces for user scripts to create and update native objects. For example, the script system can provide interfaces like onStart and onUpdate to perform initialization and update in user scripts. User scripts need to create the native object defined in the resource definition file.

A user may want to update the at least one new type of asset. For example, the user may want to re-configure the properties of the at least one new type of asset. At 908, the at least one new type of asset may be updated by modifying the properties of the at least one new type of asset and updating the scripts corresponding to the at least one new type of asset.

Figure 10:
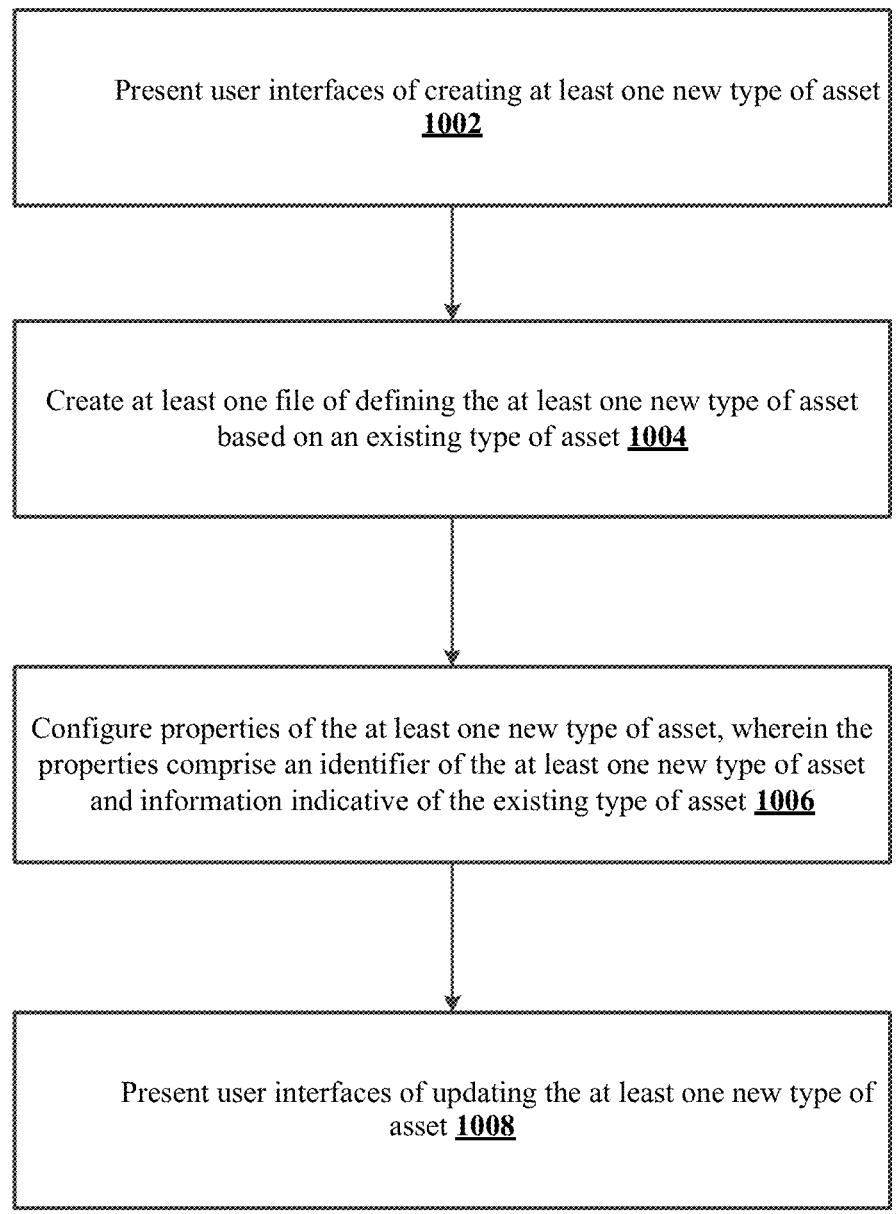
FIG. 10 shows another example process for custom asset creation.

FIG. 10 illustrates an example process 1000 performed by one or more components shown in the diagram 100. For example, the process 1000 may be performed, at least in part, by a design service (e.g., design service 118) or a design application (e.g., design application 112). The process 1000 may be performed to facilitate the creation of a custom asset. Although depicted as a sequence of operations in FIG. 10, those of ordinary skill in the art will appreciate that various embodiments may add, remove, reorder, or modify the depicted operations.

At 1002, user interfaces of creating at least one new type of asset may be presented. For example, the UI 200 or a similar interface may be presented to a user of the design service 118. The user may utilize the user interfaces to create a custom asset that is an extension of an existing (i.e., native) asset. As described above, a user, such as a user of the design service 118, may create a custom asset by extending an existing asset type, without ever touching C++ code. At 1004, at least one file defining the at least one new type of asset may be created based on an existing type of asset. The at least one file defining the at least one new type of asset may be in any suitable format, such a JSON (JavaScript Object Notation) format or an XML (Extensible Markup Language) format. The existing (e.g., native) asset type may comprise, for example, texture or mesh.

At 1006, properties of the at least one new types of asset may be configured. The properties comprise an identifier of the at least one new type of asset and information indicative of the existing type of asset. Each asset definition may include four common properties and its specific properties. For example, each asset definition includes a unique ID for each asset ("uuid") for resource reference, a type that stands for a native asset type (e.g., texture, mesh), a subtype that stands for the newly defined custom assets (e.g., segmentation), and a native object type that a custom asset passes to the engine (i.e., "rtti."). An effect custom asset entry may include a script path. The script path is the path where the user script is. An effect custom asset entry may include custom resource properties specified by user, such as color and size.

A user may want to update the at least one new type of asset. For example, the user may want to re-configure the properties of the at least one new type of asset. At 1008, user interfaces of updating the at least one new type of asset may be presented. The at least one new type of asset may be updated by modifying the properties of the at least one new type of asset via the interfaces. Updating the at least one new type of asset may additionally comprise updating the scripts corresponding to the at least one new type of asset.

Figure 13:
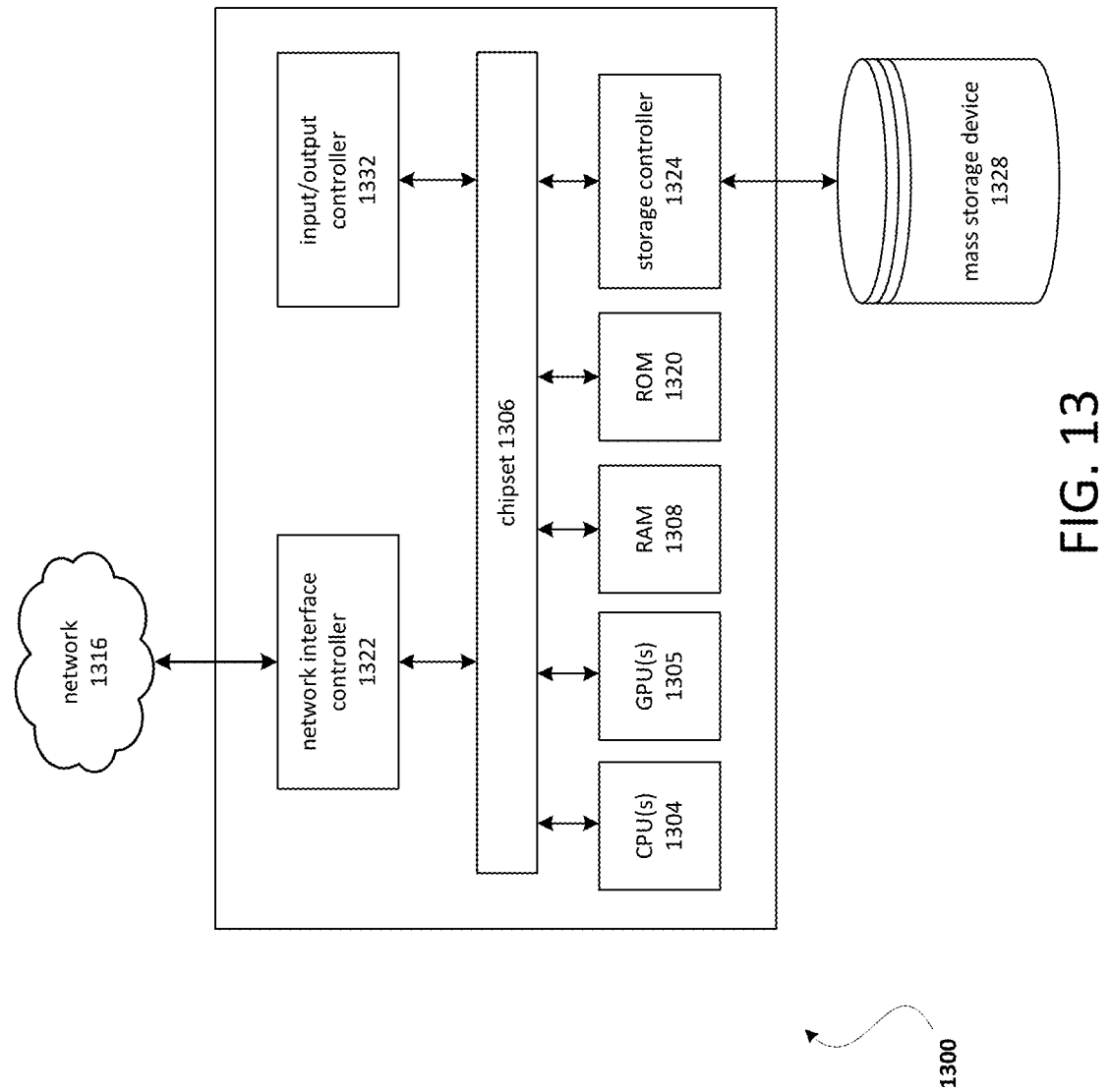
FIG. 13 shows an example computing device which may be used to perform any of the techniques disclosed herein.

FIG. 13 illustrates a computing device that may be used in various aspects, such as the services, networks, modules, and/or devices depicted in FIG. 1. With regard to the example architecture of FIG. 1, the cloud network (and any of its components), the client devices, and/or the network may each be implemented by one or more instance of a computing device 1300 of FIG. 13. The computer architecture shown in FIG. 13 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1300 may include a baseboard, or "motherboard," which is a printed circuit board to which a multitude of components or devices may be connected by way of a system bus or other electrical communication paths. One or more central processing units (CPUs) 1304 may operate in conjunction with a chipset 1306. The CPU(s) 1304 may be standard programmable processors that perform arithmetic and logical operations necessary for the operation of the computing device 1300.

The CPU(s) 1304 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1304 may be augmented with or replaced by other processing units, such as GPU(s) 1305. The GPU(s) 1305 may comprise processing units specialized for but not necessarily limited to highly parallel computations, such as graphics and other visualization-related processing.

A chipset 1306 may provide an interface between the CPU(s) 1304 and the remainder of the components and devices on the baseboard. The chipset 1306 may provide an interface to a random-access memory (RAM) 1308 used as the main memory in the computing device 1300. The chipset 1306 may further provide an interface to a computer-readable storage medium, such as a read-only memory (ROM) 1320 or non-volatile RAM (NVRAM) (not shown), for storing basic routines that may help to start up the computing device 1300 and to transfer information between the various components and devices. ROM 1320 or NVRAM may also store other software components necessary for the operation of the computing device 1300 in accordance with the aspects described herein.

The computing device 1300 may operate in a networked environment using logical connections to remote computing nodes and computer systems through local area network (LAN). The chipset 1306 may include functionality for providing network connectivity through a network interface controller (NIC) 1322, such as a gigabit Ethernet adapter. A NIC 1322 may be capable of connecting the computing device 1300 to other computing nodes over a network 1316. It should be appreciated that multiple NICs 1322 may be present in the computing device 1300, connecting the computing device to other types of networks and remote computer systems.

The computing device 1300 may be connected to a mass storage device 1328 that provides non-volatile storage for the computer. The mass storage device 1328 may store system programs, application programs, other program modules, and data, which have been described in greater detail herein. The mass storage device 1328 may be connected to the computing device 1300 through a storage controller 1324 connected to the chipset 1306. The mass storage device 1328 may consist of one or more physical storage units. The mass storage device 1328 may comprise a management component 1313. A storage controller 1324 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1300 may store data on the mass storage device 1328 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1328 is characterized as primary or secondary storage and the like.

For example, the computing device 1300 may store information to the mass storage device 1328 by issuing instructions through a storage controller 1324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1300 may further read information from the mass storage device 1328 by detecting the physical states or characteristics of one or more particular locations within the physical storage units.

In addition to the mass storage device 1328 described above, the computing device 1300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1300.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1328 depicted in FIG. 13, may store an operating system utilized to control the operation of the computing device 1300. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1328 may store other system or application programs and data utilized by the computing device 1300.

The mass storage device 1328 or other computer-readable storage media may also be encoded with computer-executable instructions, which, when loaded into the computing device 1300, transforms the computing device from a general-purpose computing system into a special-purpose computer capable of implementing the aspects described herein. These computer-executable instructions transform the computing device 1300 by specifying how the CPU(s) 1304 transition between states, as described above. The computing device 1300 may have access to computer-readable storage media storing computer-executable instructions, which, when executed by the computing device 1300, may perform the methods described herein.

A computing device, such as the computing device 1300 depicted in FIG. 13, may also include an input/output controller 1332 for receiving and processing input from a number of input devices, such as a keyboard, a mouse, a touchpad, a touch screen, an electronic stylus, or other type of input device. Similarly, an input/output controller 1332 may provide output to a display, such as a computer monitor, a flat-panel display, a digital projector, a printer, a plotter, or other type of output device. It will be appreciated that the computing device 1300 may not include all of the components shown in FIG. 13, may include other components that are not explicitly shown in FIG. 13, or may utilize an architecture completely different than that shown in FIG. 13.

As described herein, a computing device may be a physical computing device, such as the computing device 1300 of FIG. 13. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
creating at least one file of defining at least one new type of asset based on an existing type of asset, wherein the at least one new type of asset enables to create a new effect asset while avoiding an inflation of a package size of an effect creation tool;
configuring properties of the new effect asset, wherein the properties comprise an identifier of the new effect asset, information indicative of the existing type of asset, information indicating a particular type of the new effect asset, and information indicative of specific features of the new effect asset; and
implementing the at least one new type of asset with scripts, wherein the implementing the at least one new type of asset with scripts comprises fetching a native object corresponding to the existing type of asset.

2. The method of claim 1, further comprising:
loading the at least one file of defining the at least one new type of asset;
loading and initializing the scripts corresponding to the at least one new type of asset; and
applying the at least one new type of asset in image frames.

3. The method of claim 1, further comprising:
accessing the at least one new type of asset by any systems in the effect creation tool based on a Uniform Resource Locator (URL) corresponding to the at least one new type of asset, wherein the URL comprises the identifier of the new effect asset.

4. The method of claim 1, further comprising:
updating the at least one new type of asset by modifying the specific features of the new effect asset and updating the scripts corresponding to the at least one new type of asset.

5. The method of claim 1, further comprising:
presenting user interfaces of creating and updating the at least one new type of asset.

6. The method of claim 1, further comprising:
presenting user interfaces of updating the native object corresponding to the existing type of asset.

7. The method of claim 1, wherein the at least one file of defining at least one new type of asset is in any format comprising a JSON (JavaScript Object Notation) format and an XML (Extensible Markup Language) format.

8. The method of claim 1, wherein the existing type of asset comprise a texture and a mesh.

9. A system, comprising:
at least one processor; and
at least one memory comprising computer-readable instructions that upon execution by the at least one processor cause the system to perform operations comprising:
creating at least one file of defining at least one new type of asset based on an existing type of asset, wherein the at least one new type of asset enables to create a new effect asset while avoiding an inflation of a package size of an effect creation tool;
configuring properties of the new effect asset, wherein the properties comprise an identifier of the new effect asset, information indicative of the existing type of asset, information indicating a particular type of the new effect asset, and information indicative of specific features of the new effect asset; and
implementing the at least one new type of asset with scripts, wherein the implementing the at least one new type of asset with scripts comprises fetching a native object corresponding to the existing type of asset.

10. The system of claim 9, the operations further comprising:

loading the at least one file of defining the at least one new type of asset;

loading and initializing the scripts corresponding to the at least one new type of asset; and applying the at least one new type of asset in image frames.

11. The system of claim 9, the operations further comprising:

accessing the at least one new type of asset by any systems in the effect creation tool based on a Uniform Resource Locator (URL) corresponding to the at least one new type of asset, wherein the URL comprises the identifier of the new effect asset.

12. The system of claim 9, the operations further comprising:

updating the at least one new type of asset by modifying the specific features of the new effect asset and updating the scripts corresponding to the at least one new type of asset.

13. The system of claim 9, the operations further comprising:

presenting user interfaces of creating and updating the at least one new type of asset.

14. The system of claim 9, the operations further comprising:

presenting user interfaces of updating the native object corresponding to the existing type of asset.

15. A non-transitory computer-readable storage medium, storing computer-readable instructions that upon execution by a processor cause the processor to implement operations, the operation comprising:

creating at least one file of defining at least one new type of asset based on an existing type of asset, wherein the at least one new type of asset enables to create a new effect asset while avoiding an inflation of a package size of an effect creation tool;

configuring properties of the new effect asset, wherein the properties comprise an identifier of the new effect asset, information indicative of the existing type of asset, information indicating a particular type of the new effect asset, and information indicative of specific features of the new effect asset; and implementing the at least one new type of asset with scripts, wherein the implementing the at least one new type of asset with scripts comprises fetching a native object corresponding to the existing type of asset.

16. The non-transitory computer-readable storage medium of claim 15, the operations further comprising:

loading the at least one file of defining the at least one new type of asset;

loading and initializing the scripts corresponding to the at least one new type of asset; and applying the at least one new type of asset in image frames.

17. The non-transitory computer-readable storage medium of claim 15, the operations further comprising:

accessing the at least one new type of asset by any systems in the effect creation tool based on a Uniform Resource Locator (URL) corresponding to the at least one new type of asset, wherein the URL comprises the identifier of the new effect asset.

18. The non-transitory computer-readable storage medium of claim 15, the operations further comprising:

updating the at least one new type of asset by modifying the specific features of the new effect asset and updating the scripts corresponding to the at least one new type of asset.

19. The non-transitory computer-readable storage medium of claim 15, the operations further comprising:

presenting user interfaces of creating and updating the at least one new type of asset.

20. The non-transitory computer-readable storage medium of claim 15, the operations further comprising:

presenting user interfaces of updating the native object corresponding to the existing type of asset.

\* \* \* \* \*